(12) United States Patent
Ungerer et al.

(10) Patent No.: US 9,745,964 B2
(45) Date of Patent: Aug. 29, 2017

(54) STEAM POWER PLANT HAVING SOLAR COLLECTORS

(75) Inventors: Bjoern Ungerer, Bad Schoenborn (DE); Ewald Kitzmann, Weinheim (DE); Volker Schuele, Leimen (DE)

(73) Assignee: General Electric Technology GmbH, Baden (CH)

( * ) Notice: Subject to any disclaimer, the term of this patent is extended or adjusted under 35 U.S.C. 154(b) by 724 days.

(21) Appl. No.: 13/138,854

(22) PCT Filed: Feb. 19, 2010

(86) PCT No.: PCT/EP2010/001037
§ 371 (c)(1),
(2), (4) Date: Dec. 23, 2011

(87) PCT Pub. No.: WO2010/118796
PCT Pub. Date: Oct. 21, 2010

(65) Prior Publication Data
US 2012/0151917 A1    Jun. 21, 2012

(30) Foreign Application Priority Data

Apr. 18, 2009 (DE) .................. 10 2009 018 027
Dec. 2, 2009 (DE) .................. 10 2009 056 707

(51) Int. Cl.
*F24J 2/07* (2006.01)
*F24J 2/42* (2006.01)
(Continued)

(52) U.S. Cl.
CPC ............. *F03G 6/067* (2013.01); *F01K 3/18* (2013.01); *F01K 7/22* (2013.01); *F03G 6/00* (2013.01);
(Continued)

(58) Field of Classification Search
CPC ......... Y02E 10/46; Y02E 10/44; Y02E 20/14; Y02E 20/18; Y02E 20/326; Y02E 20/344;
(Continued)

(56) References Cited

U.S. PATENT DOCUMENTS 2,908,255 A * 10/1959 Rupprecht .................... 122/1 B
2,968,916 A *  1/1961 Fayette et al. ............... 60/641.8
(Continued)

FOREIGN PATENT DOCUMENTS

CN   86105222 A   6/1987
CN   2429732 Y    5/2001
(Continued)

OTHER PUBLICATIONS

Marko A., "Verbesserung fossilgefeuerter Dampfkraftwerke durch Solare Waermezufuhr", BWK Brennstoff Warem Kraft, Springer VDI Verlag, Duesseldorf, DE, vol. 47, No. 7/08, Jul. 1, 1995.*
(Continued)

*Primary Examiner* — Mark Laurenzi
*Assistant Examiner* — Wesley Harris
(74) *Attorney, Agent, or Firm* — GE Global Patent Operation; Cynthia W. Flanigan

(57) ABSTRACT

The invention relates to a method and to a steam power plant, wherein solar energy can be very flexibly and very efficiently coupled into the water steam circuit of the steam power plant.

8 Claims, 10 Drawing Sheets

(51) Int. Cl.
*F03G 6/06* (2006.01)
*F03G 6/00* (2006.01)
*F22B 1/00* (2006.01)
*F01K 3/18* (2006.01)
*F01K 7/22* (2006.01)

(52) U.S. Cl.
CPC ............... *F03G 6/003* (2013.01); *F03G 6/06* (2013.01); *F03G 6/065* (2013.01); *F22B 1/006* (2013.01); *F24J 2/07* (2013.01); *F24J 2/42* (2013.01); *Y02E 10/44* (2013.01); *Y02E 10/46* (2013.01)

(58) Field of Classification Search
CPC ... Y02E 30/40; Y02E 10/10; F24J 2/07; F24J 2/42; F03G 6/065; F03G 6/00; F03G 6/06; F03G 6/067; F03G 6/003; F22B 1/006; F01K 23/10; F01K 7/40; F01K 25/08; F01K 13/02; F01K 7/22; F01K 23/106; F01K 13/00; F01K 23/04; F01K 23/06; F01K 25/10; F01K 3/18; F02C 6/18
USPC .......................... 60/641.8–641.15, 643–685
See application file for complete search history.

(56) References Cited

U.S. PATENT DOCUMENTS

| | | | | |
|---|---|---|---|---|
| 3,271,960 | A * | 9/1966 | Brunner | F01K 7/24 60/648 |
| 3,667,217 | A * | 6/1972 | Vidal | F01K 23/105 60/39.182 |
| 4,043,130 | A * | 8/1977 | Brown | F01K 7/223 60/652 |
| 4,069,674 | A * | 1/1978 | Warren | 60/641.8 |
| 4,976,107 | A * | 12/1990 | Korpela | 60/670 |
| 5,675,970 | A * | 10/1997 | Yamada et al. | 60/670 |
| 7,331,178 | B2 * | 2/2008 | Goldman | 60/641.11 |
| 2006/0266039 | A1 * | 11/2006 | Skowronski et al. | 60/641.8 |
| 2007/0157614 | A1 | 7/2007 | Goldmann | |
| 2008/0034757 | A1 | 2/2008 | Skowronski et al. | |
| 2008/0289334 | A1 * | 11/2008 | Orosz et al. | 60/641.8 |

FOREIGN PATENT DOCUMENTS

| | | | |
|---|---|---|---|
| CN | 1673527 A | 9/2005 | |
| CN | 101261001 A | 9/2008 | |
| EP | 0 526 816 | 2/1993 | |
| EP | 2 037 192 | 3/2009 | |
| JP | 562411 A | 1/1981 | |
| WO | WO97/14887 | 4/1997 | |
| WO | WO 2009034577 A2 * | 3/2009 | ............... F03G 6/06 |

OTHER PUBLICATIONS

"Solar-coal Complementary Electric Generation System and Its Modes", Cui, Ying-hong, Yang Yong-ping,& Zhang Ming-zhi, vol. 28, No. 5, Feb. 15, 2008, pp. 102-107.
The Second Chinese Office Action, dated Aug. 5, 2014 for CN Application No. 201080017157.8.
Odeh, "Unified Model of Solar Thermal Electric Generation Systems", Renewable Energy, vol. No. 28, 5th Edition, pp. 755-767, Apr. 30, 2003.
Unofficial English translation of Office Action issued in connection with corresponding CN Application No. 201080017157.5 on Oct. 10, 2013.
Guangduo et al., "Analysis on Thermal Efficiency of Solar Energy Utilised by Regenerative System of Thermal Power Plant", Solar Energy Journal, vol. No. 8, Issue No. 3, 3rd Edition, pp. 282-286, Jul. 31, 1987 Translation of Abstract on last page.
Ying-Hong et al., "Economic research on integration scheme of solar energy and coal", Journal of North China Electric Power University, vol. No. 36, Issue No. 1, 1st Edition, pp. 69-75, Jan. 31, 2009 Translation of Abstract.

* cited by examiner

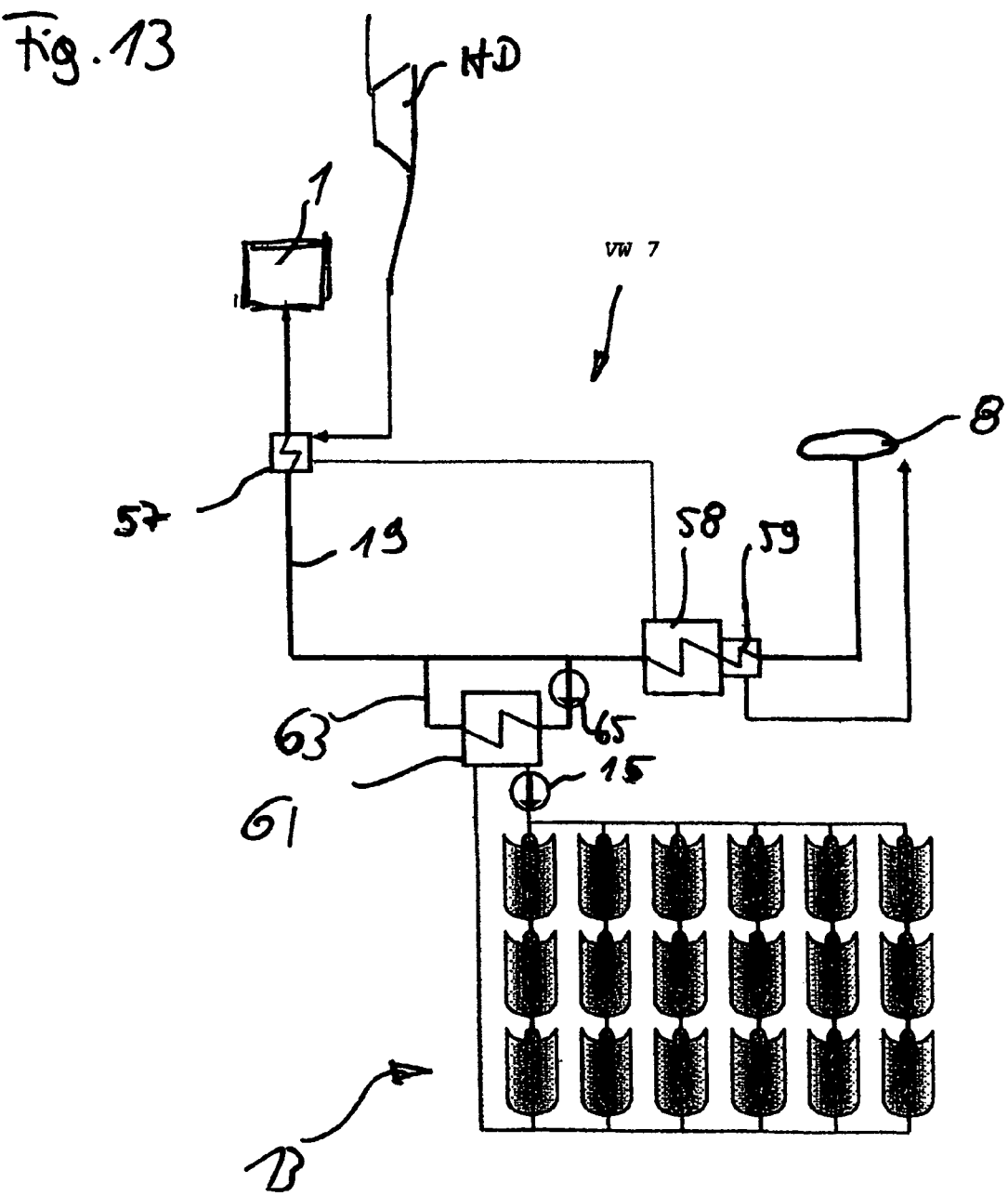

STEAM POWER PLANT HAVING SOLAR COLLECTORS

This application is the national stage of PCT/EP2010/001037 filed on Feb. 19, 2010 and claims Paris Convention Priority of DE 10 2009 018 027.3 filed Apr. 18, 2009 as well as DE 10 2009 056 707.0 filed Dec. 2, 2009.

BACKGROUND OF THE INVENTION

Conventional steam power plants have a closed water-steam circuit, to which energy is supplied into the boiler feed water in the steam generator by burning a fossil fuel, such that it is transferred into the vaporous state of aggregation. This steam drives a generator via one or more steam turbines and is subsequently reliquefied in a condenser.

There have been attempts in the past to couple thermal energy into the water-steam circuit of a steam power plant that is fuelled with fossil fuels in order to thereby increase the electric power and/or reduce the fuel consumption.

For example, U.S. Pat. No. 4,069,674 discloses preheating a partial flow of the condensate in solar collectors and subsequently introduce it again into the pre-heating line. This method bypasses all preheaters. This means that the partial flow of the condensate is branched off upstream of the first preheater and, after passage through the solar collectors, the partial flow of the condensate, which has been preheated by solar energy, is coupled again into the main condensate flow downstream of the last preheater.

The partial flow that has been preheated by solar energy must have the same temperature as the main condensate flow preheated in the preheaters, which results in a large temperature difference of the partial condensate flow in the solar collectors. This large temperature difference can be achieved only on a few days during the year or within a few hours during the year such that the contribution of the solar collectors to preheating of the condensate is relatively small.

US 2008/0034757 A1 discloses a similar method, in which a heat exchanger is provided in series with the preheaters. The condensate is heated in this heat exchanger by thermal oil which has, in turn, been heated by solar collectors.

This method is disadvantageous in that the series arrangement of the heat exchanger causes additional pressure loss in the water-steam circuit even when no heat is coupled in via this heat exchanger, e.g. due to insufficient solar radiation. This system is moreover comparatively inflexible such that the solar collectors can provide an appreciable amount only in case of optimum solar radiation. The production costs are moreover relatively high, since all components must be designed to be high-pressure resistant.

WO97/14887 discloses a method for generating wet steam in a field of solar collectors. The wet steam can be directly fed into the separating bottle or the drum of the steam generator. This method is disadvantageous in that solar thermal energy is coupled-in only at a fixed temperature level and retrofitting requires interference with the steam generator.

In summary, one can state that these conventional steam power plants with solar thermal support have little flexibility with respect to temperatures at which solar energy can be coupled into the water-steam circuit. In consequence thereof, only a comparatively small part of solar energy contributes to generation of electric energy.

It is the underlying purpose of the present invention to provide a steam power plant and a method, which improve the contribution of solar radiation to the generation of electric power of a steam power plant having a fossil-fuel steam generator.

SUMMARY OF THE INVENTION

The inventive power plant shall also allow easy adaptation to different geographical conditions and ambient conditions. Retrofitting to existing power plants should also be possible and the availability and reliability of the power plant should remain at the same high level.

This object is achieved in accordance with the invention with a steam power plant comprising a boiler, a turbine, a condenser and at least one preheater in that at least one heat exchanger is provided in parallel with one or more preheaters, and heat from one or more solar collectors is transferred in the at least one heat exchanger onto the partial flow of the condensate that flows through the at least one heat exchanger.

In accordance with the invention, the solar energy can be introduced or coupled-in at different temperature levels due to the fact that the heat exchanger, which helps to couple the heat produced by solar energy into the steam power plant, and one or more of the preheaters are connected in parallel.

When e.g. several non-concentrating solar collectors are used, it is advisable to couple-in the solar energy at low temperatures, i.e. in the region of the first preheaters downstream of the condenser. If, however, concentrating solar collectors are used, it is more advantageous to couple the heat generated by these high-temperature solar collectors into the steam circuit at a higher temperature level by arranging the heat exchanger parallel to one or more preheaters which are located directly upstream of the steam generator or the economizer.

In one variant of the invention, several preheaters are provided, which are connected in series, in particular low-pressure preheaters or high-pressure preheaters, and the at least one heat exchanger and one or more of the preheaters can be switched in parallel. For this reason, it is possible to couple the gained solar energy into the water-steam circuit at that location, where the condensate flowing through the preheaters has approximately the same temperature as the temperature that can be achieved in the solar collectors in dependence on the instantaneously available solar radiation.

This heat exchanger may also be connected e.g. in parallel with two preheaters to thereby increase the temperature difference. It is moreover also possible to couple and/or decouple the heat exchanger into/from the main feed water flow at different locations during the day during running operation in dependence on the available solar radiation and the resulting temperature of the heat carrier flowing through the solar collectors. For this reason, solar energy can be optimally coupled into the water-steam circuit during the whole day despite varying efficiency of the solar collectors.

It is thereby possible to considerably increase the contribution of the solar collectors to heating of the feed water and increase the economic efficiency of the inventive power plant. It is moreover possible to ensure a significant contribution of the solar collectors to the energy supply into the water-steam circuit of the power plant despite a comparatively small number of heat exchangers and a comparatively small transmission capacity.

The parallel connection also enables operation of the fossil steam power plant without additional flow resistances or impairment of the efficiency during operating times without solar radiation.

The above-mentioned object is achieved with a steam power plant comprising a boiler, a superheater and/or one or more intermediate superheaters, a turbine and a condenser, wherein, for controlling the live steam temperature and/or for controlling the temperature of the superheated steam condensate that is extracted via a feed water line, injection is performed into the superheater and/or the intermediate superheaters, in that a third heat exchanger is provided parallel to the feed water line, and heat from one or more solar collectors can be transferred to the feed water in the third heat exchanger.

The invention therefore also enables control of the condensate which is used for controlling the temperature of the live steam or the steam superheated in the intermediate superheaters. The following applies in this connection: The higher the temperature of the condensate, the larger the amount of injected water that can be introduced into the superheated steam in order to obtain the desired steam parameters. This also means that the steam generator (1) requires less fuel for identical power plant capacity due to the temperature increase of the feed water caused by solar power, such that this also yields a significant contribution of the heat gained in the solar collectors to the generation of power.

The flexible arrangement or introduction of the heat, which is generated in the solar collectors, into the superheater or one or more intermediate superheaters, also maximizes, in this case, coupling-in of the heat gained in the solar collectors in a flexible fashion in accordance with the instantaneous efficiency of the solar collectors. This increases the contribution of solar radiation to the generation of power and correspondingly reduces the fuel consumption and/or increases the capacity.

Alternatively or additionally, in a power plant comprising a boiler, a turbine, a condenser, a feed water pump and a feed water pump power turbine that is operated by steam and a steam pipeline disposed between the turbine and the feed water power turbine, a fourth heat exchanger may be provided in the steam pipeline and the heat gained in one or more solar collectors is transferred in the fourth heat exchanger to the steam flowing in the steam pipeline.

The steam extracted from the turbine can thereby be superheated by means of the solar collectors, which results in a corresponding power increase of the feed water pump power turbine. Since the power of the feed water pump power turbine is predetermined by the operating point of the power plant, the amount of steam that is extracted from the turbine may be correspondingly smaller such that the electric power of the power plant correspondingly increases and/or the fuel consumption is correspondingly reduced.

A further advantageous embodiment of the inventive power plant comprises a boiler, a turbine and a condenser, wherein a coolant, in particular water, which is cooled e.g. in a cooling tower or a river, flows through the condenser, wherein the coolant may be cooled in accordance with the invention prior to entry into the condenser using an absorption refrigerator that is operated by solar energy.

For this reason, the temperature at which the coolant enters the condenser is decreased. As a result, the pressure in the condenser also decreases, thereby increasing the pressure difference which the steam turbine can use for conversion into mechanical work. As a result, the capacity of the turbine increases when the steam flow rate remains the same. Since the cooling capacity of the absorption refrigerator is naturally always at a maximum level when the solar radiation is very high and at the same time, the coolant has a comparatively high temperature prior to entry into the condenser due to the increased ambient temperature, this measure is particularly effective when the efficiency and the capacity of the power plant have decreased due to an increased ambient temperature.

Depending on the temperature level and other boundary conditions, the solar collectors of the inventive steam power plants may be concentrating collectors such as e.g. parabolic trough collectors, Fresnel collectors or tower receivers with a heliostatic field, or non-concentrating collectors, in particular flat collectors or vacuum tube collectors.

This again illustrates the flexibility of the inventive steam power plant, since it allows optimum consideration of the solar radiation that is present at the location of the power plant and also of the prices and the operating behavior of the most different solar collectors in the design of the inventive steam power plant.

Water or thermal oil may be used as a heat carrier for the solar collectors and the thermal side of the heat exchanger in accordance with the invention. This, however, also depends on the operating temperatures of the solar collectors such that the heat carrier also provides maximum flexibility.

The underlying object of the invention is also achieved by methods of the dependent claims, thereby realizing the above-described advantages.

Further advantages and advantageous embodiments of the invention can be extracted from the following drawing, the description thereof and the claims. All features described in the drawing, the description thereof, and the claims, may be essential to the invention either individually and also collectively in arbitrary combination.

In the drawing:

BRIEF DESCRIPTION OF THE DRAWING

FIGS. 5 through 13 show embodiments of inventive steam power plants.

DESCRIPTION OF THE PREFERRED EMBODIMENTS

Figure 1:
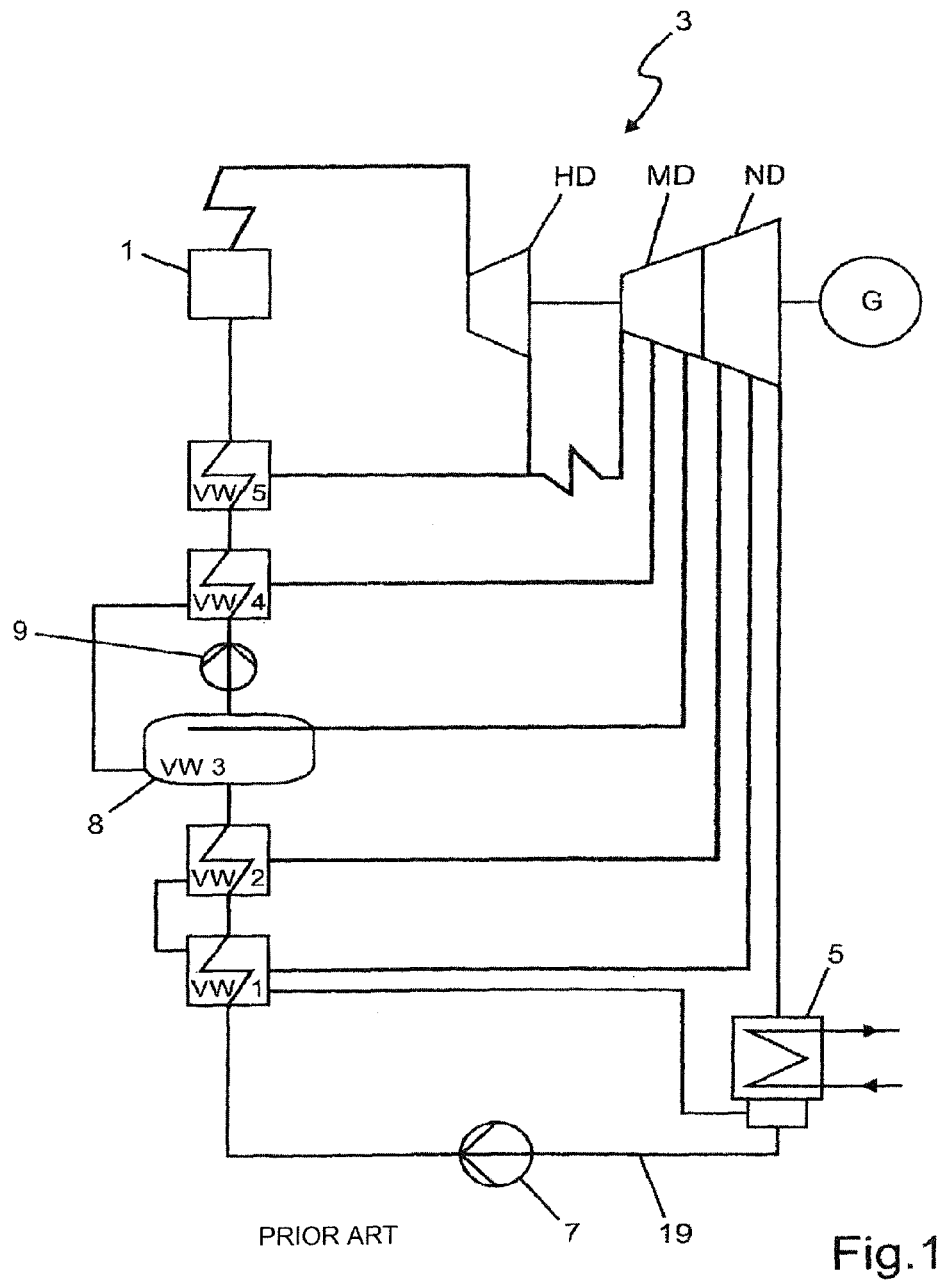
FIG. 1 shows a circuit diagram of a conventional steam power plant.

FIG. 1 shows a conventional steam power plant that is fuelled by fossil fuels or biomass. FIG. 1 mainly serves to designate the individual components of the power plant and illustrate the overall context of the water-steam circuit, since the subsequent figures only show parts of the water-steam circuit, which are essential to the invention, for reasons of simplicity.

Live steam is generated from the feed water in a steam generator 1 using fossil fuels or biomass. The live steam is relaxed in a steam turbine 3, thereby driving a generator G. The turbine 3 may be subdivided into a high-pressure part HD, a medium-pressure part MD and several low-pressure parts ND.

After relaxation of the steam in the turbine 3, it flows into a condenser 5, where it is liquefied. Towards this end, a coolant, which is generally in liquid form, such as e.g. cooling water, is supplied to the condenser 5. Prior to entering the condenser 5, this cooling water is cooled in a cooling tower (not shown) or by a river (not shown) that flows in the vicinity of the power plant.

The condensate generated in the condenser 5 is supplied to several preheaters $Vw_i$ by a condensate pump 7, with i= 1 . . . n. In the illustrated embodiment, a feed water boiler 8 is disposed downstream of the second preheater VW2. A feed water pump 9 is provided downstream of the feed water boiler 8.

In connection with the invention, it is important that the feed water from the condenser 5 is preheated with steam starting in the first preheater VW1 up to the last preheater VW5. The temperature of the condensate or feed water thereby increases from one preheater to the next and the temperature of the steam used for preheating must correspondingly rise.

In the illustrated example, the preheaters VW1 and VW2 are heated with steam from the high-pressure part HD of the steam turbine 3, whereas the last preheater VW5 is heated with steam from the low-pressure part ND of the steam turbine 3.

The third preheater VW3 formed in the feed water container 8 is heated with steam from the medium-pressure part MD of the turbine 3.

Figure 2:
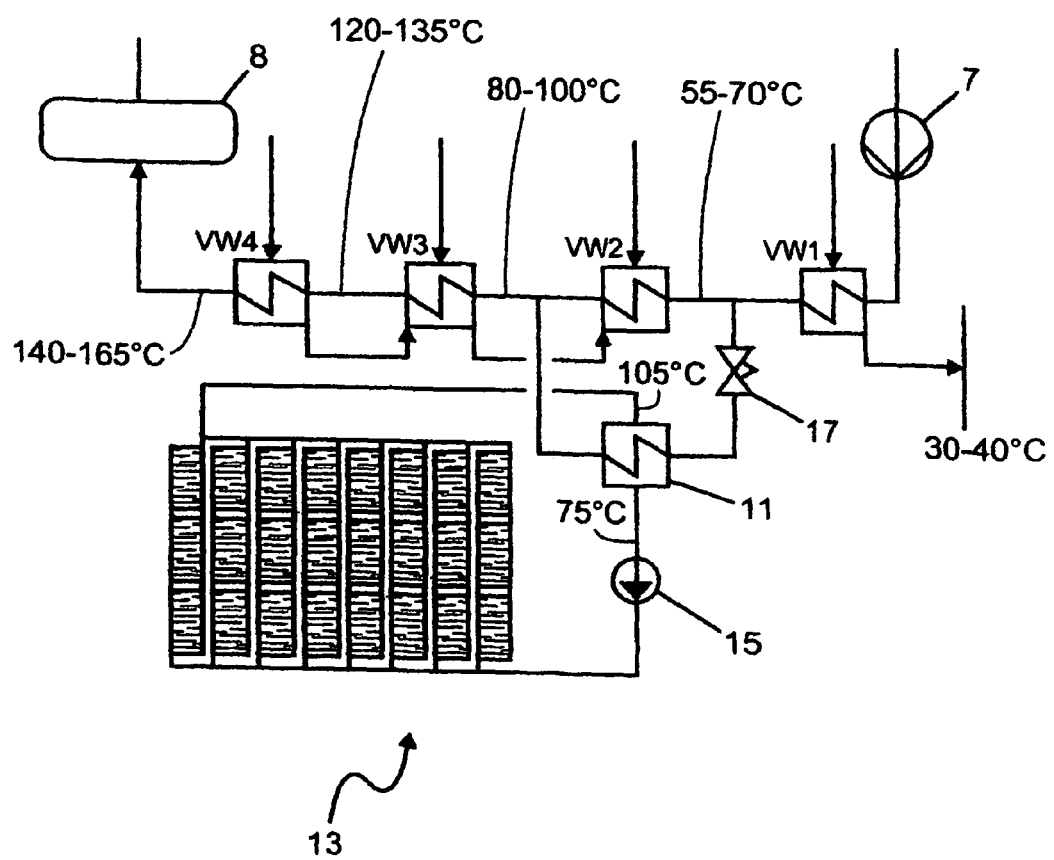
FIGS. 2 and 3 show embodiments of inventive steam power plants.

FIG. 2 shows a first embodiment of an inventive steam power plant, which utilizes the reference numerals that were used in connection with FIG. 1.

An overall number of four preheaters VW1 to VW4 are arranged between the condensate pump 7 and the feed water container 8 in FIG. 2. These are the so-called low-pressure preheaters.

As is illustrated in FIG. 2, the condensate enters the first preheater VW1 at a temperature of 30° to 40° and is preheated at that location to an exit temperature of between 55° C. and approximately 70° C. by means of steam from the steam turbine 3 (see FIG. 1). The supply of steam is indicated in FIG. 2 by arrows without reference numerals.

The temperature difference between inlet temperature and outlet temperature of the second preheater VW2 is between 55° C. and 70° C. (inlet temperature) and 80° C. and 100° C. (outlet temperature). This condensate is heated in the third preheater VW3 from 80-100° C. to 120-135° C. and in the fourth preheater VW4 it is further heated to 140 to 160° C.

In accordance with the invention, a first heat exchanger 11 is then disposed parallel to the second preheater VW2. Part of the condensate flow may thereby be guided through the first heat exchanger 11, thereby bypassing the second preheater VW2.

A heat carrier flows through the first heat exchanger 11, e.g. water, which is heated in a collector field 13 by solar radiation. For the above-mentioned temperatures of approximately 55 to maximally 100° C., flat collectors or vacuum tube collectors have turned out to be particularly efficient for the collector field 13. In a collector field 13 of this type, the heat carrier can e.g. be heated to a temperature of 105° C. on the inlet side into the first heat exchanger 11, and exits the first heat exchanger at a temperature of approximately 75°.

A circulating pump 15 is of course disposed in the heat carrier circuit in order to be able to circulate the heat carrier. The output of the circulating pump 15 is controlled in such a fashion that the heat carrier has the desired temperature upon entry into the first heat exchanger 11.

The partial flow of the condensate which flows through the first heat exchanger 11 is controlled in dependence on the instantaneous capacity of the collector field 13 in such a fashion that, when the condensate exits the first heat carrier 11, the condensate has the same temperature as the main condensate flow that flows through the second preheater VW2. Towards this end, a flow-control valve 17 is installed in the bypass of the second preheater VW2.

Figure 3:
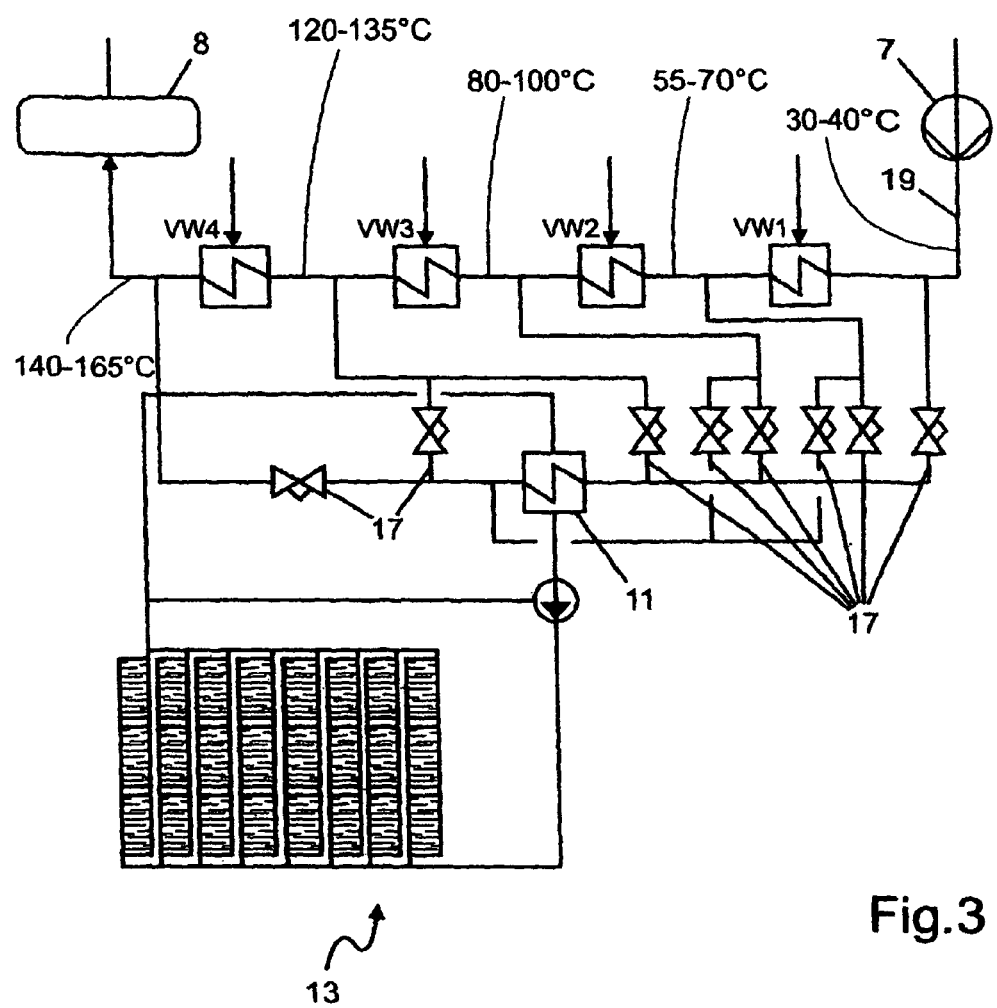

It is self-evident that e.g. in countries with high solar radiation and favorable orientation of the collector field 13, the outlet temperature that can be achieved is higher than the 105° C. indicated by way of example in FIG. 3 on the inlet side of the heat carrier into the first heat exchanger 11. In this case, the first heat exchanger 11 could be connected parallel to the third preheater 3 which is operated at higher temperatures than the second preheater VW2.

If the amount of solar radiation available is relatively small, it would, of course, also be possible to dispose the first heat exchanger 11 parallel to the first preheater VW1. This means that the heat exchanger in the collector field would have to be heated to only 75° C. The inventive concept therefore offers very great flexibility in view of solar radiation. Since the first heat exchanger 11 is connected in parallel with a preheater $Vw_i$, it is also possible to fit the first heat exchanger 11 and the collector field 13 to a steam power plant that is already in operation.

The flexibility of the inventive system becomes particularly clear with reference to FIG. 3. The essential difference between the embodiments of FIGS. 2 and 3 consists in that a bypass line (without reference numeral) is branched off in each case from a (main) feed water line 19 between the condensate pump 7 and the first heat exchanger preheater VW1 and between all preheaters and the fourth preheater 4 and the feed water boiler 8, and at least one directional control valve 17 is provided in each bypass line. As can be gathered from FIG. 3, the illustrated interconnection enables switching of the first heat exchanger 11 in parallel with either the first preheater VW1, the second preheater VW2, the third preheater VW3 or the fourth preheater VW4. Since all flow-control valves 17 can be controlled, it is also possible to operate the first heat exchanger 11 initially in parallel with the first preheater VW1 during running operation of the steam power plant e.g. in the morning when the radiation of the sun is still low. With increasing intensity of solar radiation, the first heat exchanger 11 may then be subsequently operated in parallel with the preheaters VW2, VW3, and VW4.

The circuit illustrated in FIG. 3 thereby also permits the first heat exchanger 11 to be operated e.g. in parallel with the first preheater VW1 and the second preheater VW2. This means that the partial flow that flows through the first heat exchanger 11 experiences a temperature difference starting from an inlet temperature of 30-40° C. to 80-100° C. This is naturally only possible with a very powerful collector field 13. It is, of course, also possible to connect the first heat exchanger 11 in parallel with the preheaters VW2 to VW4. All combinations of one or more preheaters are possible as illustrated in the block diagram of FIG. 3.

Figure 4:
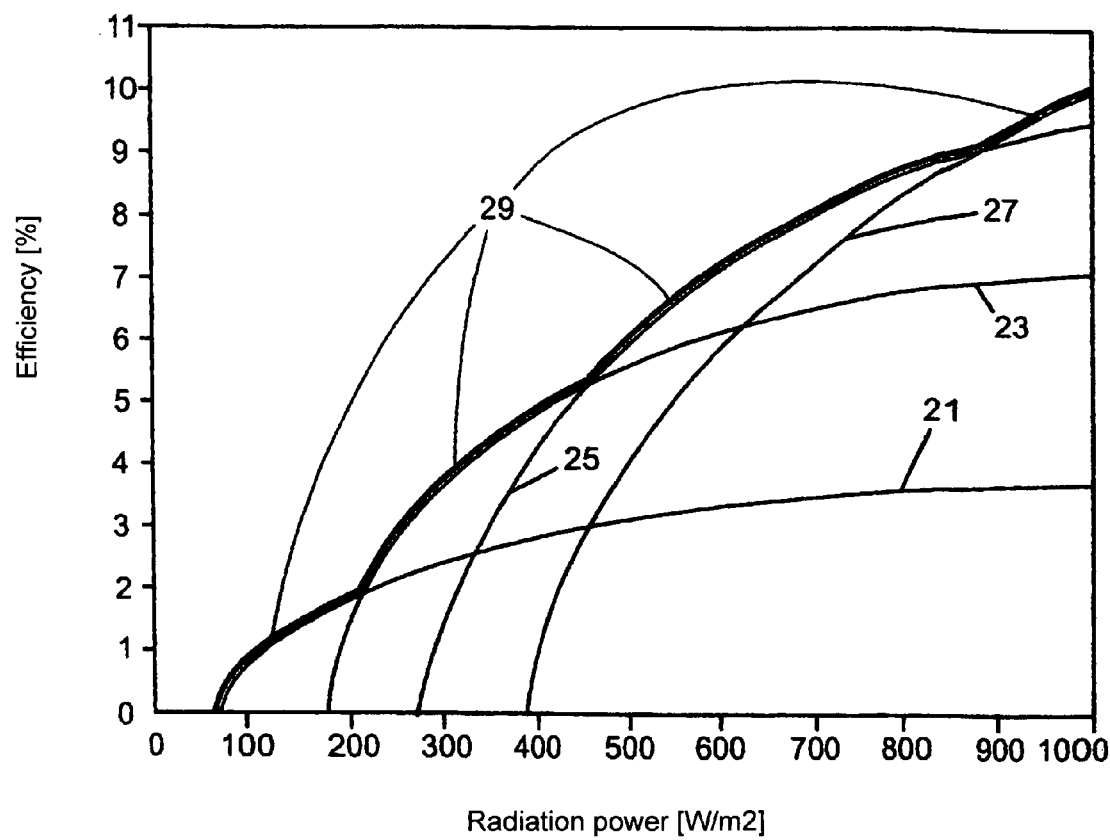
FIG. 4 shows the contribution of solar energy that is coupled into the steam power plant at different locations.

The advantages of this flexible parallel connection between the first heat exchanger 11 and one or more of the preheaters VW1 to VW4 is also illustrated in FIG. 4.

The efficiency is thereby defined as the ratio between additional (electric) power at the generator and the solar radiation power that is irradiated onto the solar collectors. Example: With a specific radiation power of 500 W/m$^2$ on 20,000 m$^2$, the solar power is 10 MW. When this power is introduced into the water-steam circuit, thereby obtaining an additional power of 3 MW at the generator, the efficiency is 30%.

In FIG. 4, the efficiency is plotted above the surface-specific power of solar radiation [W/m$^2$] for different inventive variants of coupling the solar heat into the water-steam circuit of the power plant. A first line 21 thereby shows coupling-in by means of the first heat exchanger 11 parallel to the first preheater 1. The line shape clearly shows that the utilization of solar energy contributes by more than 2% to the heat supply already at a comparatively low solar radiation of approximately 200 W/m².

When the radiation power is considerably higher (e.g. 1,000 W/m²), the contribution rises to maximally 3.3% in the example on which FIG. 4 is based. This means that this circuit is operated with particular efficiency at low radiation power and that the contribution increases only marginally at higher radiation powers.

The second line 23 represents the increase in efficiency when the first heat exchanger 11 is connected in parallel with the second preheater VW2. The shape of the second line 23 clearly shows that the solar energy can be utilized only with a solar radiation of approximately 200 W/m² and may amount to up to 7% with a radiation power of 1,000 W/m².

The third line 25 represents the increase in efficiency when the first heat exchanger 11 is connected in parallel with the third preheater VW3. The shape of the third line 25 clearly shows that the solar energy can be utilized only with a solar radiation of approximately 270 W/m² and may amount to up to 9% with a radiation power of 1,000 W/m².

The fourth line 27 represents the increase in efficiency when the first heat exchanger 11 is connected in parallel with the fourth preheater VW4. The shape of the fourth line 27 clearly shows that the solar energy can be utilized only with a solar radiation of approximately 370 W/m² and may amount to up to 10% with a radiation power of 1,000 W/m².

The increase in efficiency due to the inventive variable integration of the first heat exchanger 11 in correspondence with the available solar radiation is illustrated by the fifth line 29. This yields a maximum efficiency over the overall range of solar radiation from 200 W/m² to approximately 1000 W/m², although the first heat exchanger 11 is identical in all illustrated variants. Only a few pipelines and flow-control valves 17 (see FIG. 3) are required in order to be able to realize the inventive variable coupling-in of solar energy, and for this reason the economic efficiency of this variant is very high.

Figure 5:
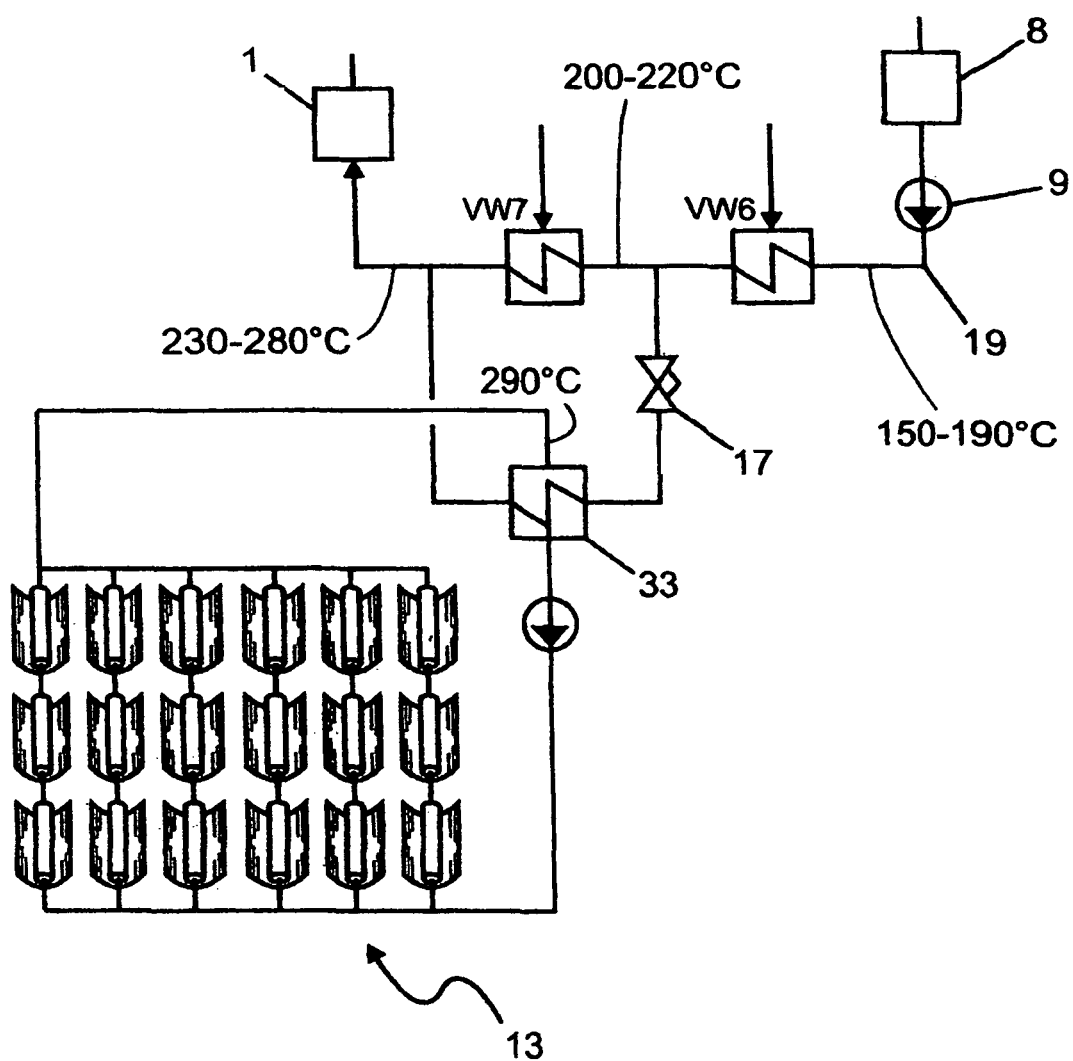

FIG. 5 shows part of a block diagram of an inventive steam power plant, in which the preheaters VW6 and VW7 are so-called high-pressure preheaters, since they are disposed downstream of the boiler feed pump 9 and upstream of the steam generator 1.

The hydraulic circuit is, in principle, the same as in the embodiment of FIGS. 2 and 3. However, the inlet temperature of the feed water prior to entry into the preheater VW6 is approximately 150 to 190° C. and is between 200 and 220° C. when it exits the sixth preheater VW6. The corresponding outlet temperature of the seventh preheater VW7 is 230 to 280° C. In the embodiment in accordance with FIG. 5, a second heat exchanger 33 is connected in parallel with the seventh preheater VW7 such that correspondingly high temperatures must be transferred from the heat exchanger of the collector field 13 into the second heat exchanger 33.

The individual collectors of the collector field of this embodiment must be designed as concentrating collectors such as e.g. parabolic trough collectors or Fresnel collectors.

Figure 6:
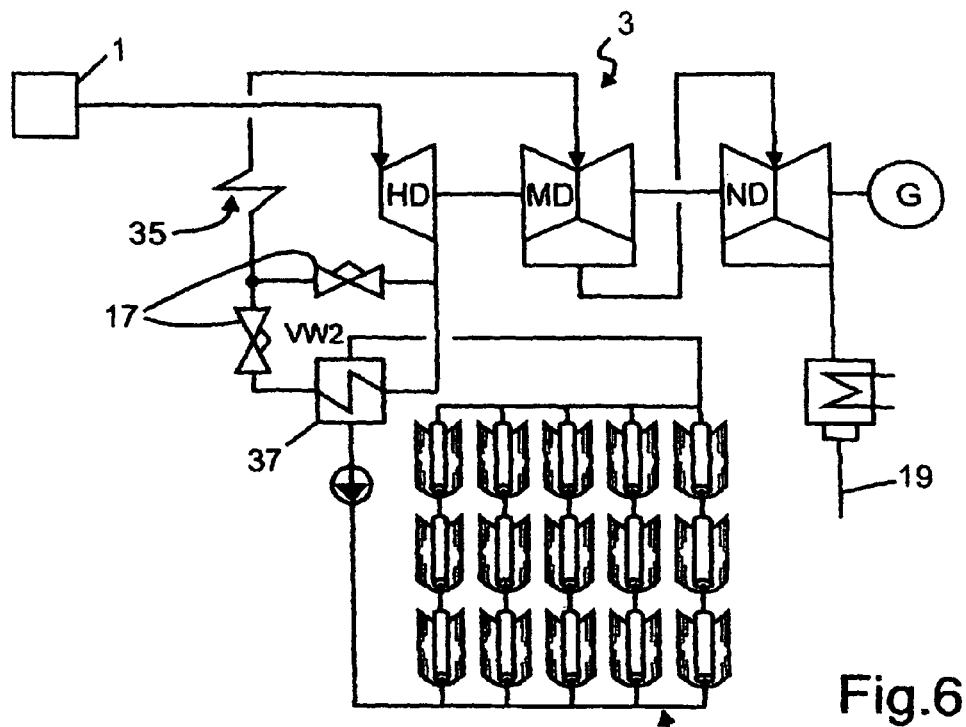

FIG. 6 shows a further embodiment of the inventive coupling-in of solar energy into a steam power plant. An intermediate superheater 35 is thereby disposed between the high-pressure part HD of the steam turbine 3 and a medium-pressure part MD of the steam turbine. In accordance with the invention, a third heat exchanger 37 is arranged between the high-pressure part HD of the steam turbine 3 and the intermediate superheater 35, and is provided with heat, generated by solar energy, from a collector field 13. Flow-control valves 17 are also provided in this case, which enable control of the steam mass flow through the third heat exchanger 37.

Figure 7:
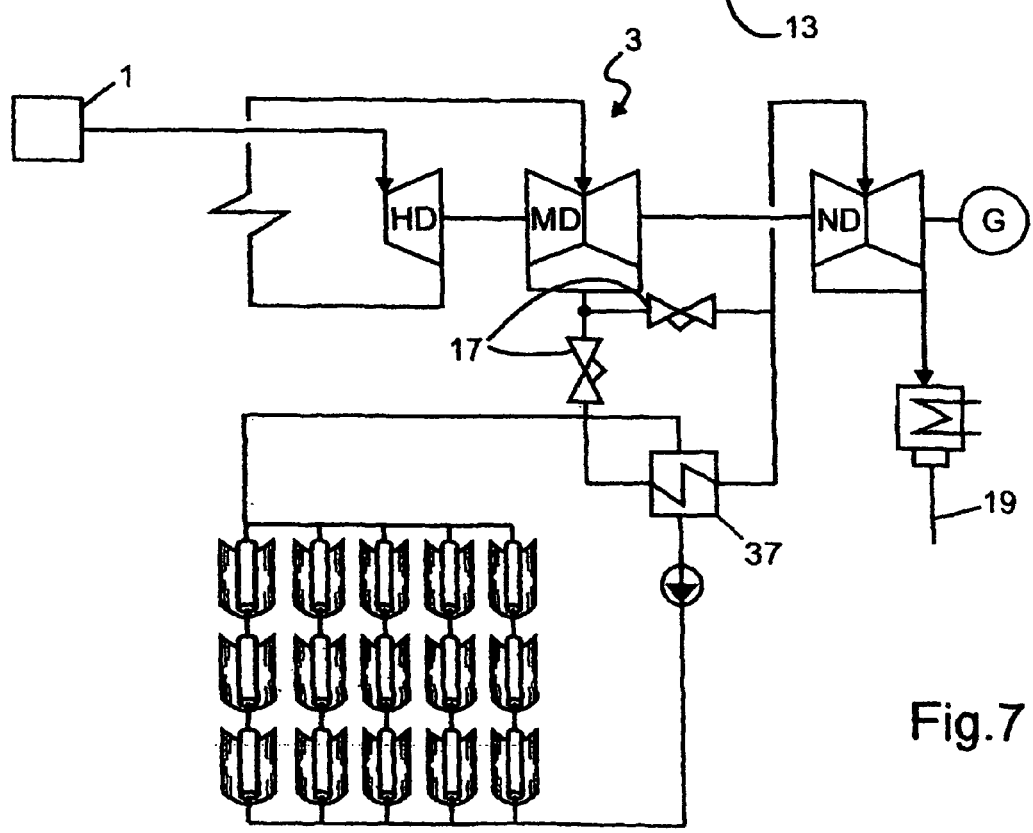

FIG. 7 shows a further embodiment of intermediate superheating. The steam is thereby intermediately heated in the third heat exchanger 37 between the medium-pressure part MD and the low-pressure part ND of the steam turbine 3. The capacity of the power plant or the fuel may thereby also be optionally increased and/or the fuel consumption of the power plant may be reduced.

Figure 8:
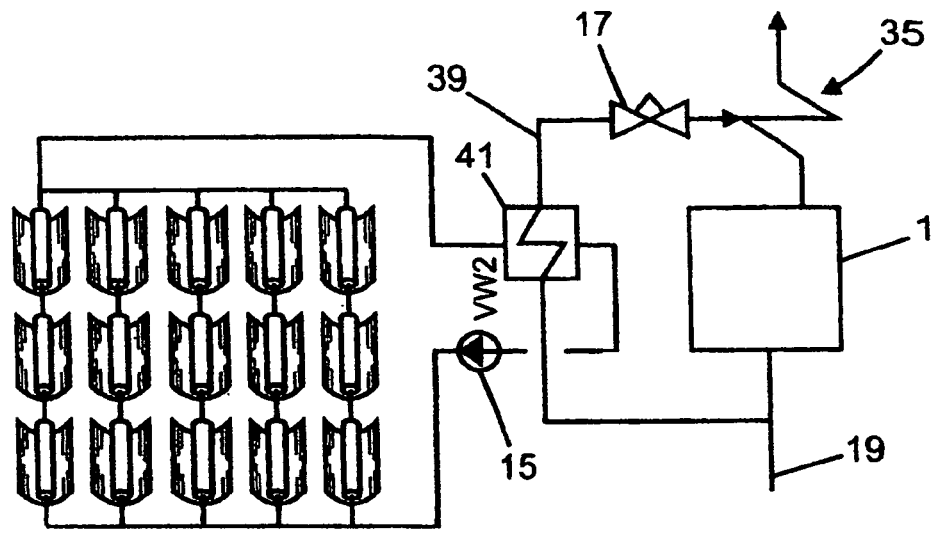

FIG. 8 shows the inventive coupling-in of solar energy into the feed water which is injected into the superheater 35 for controlling the live steam temperature.

Towards this end, a bypass line 39 is provided in a conventional fashion, which is branched off from the feed water line 19 prior to its inlet into the steam generator 1 and terminates in the superheater 35. In order to be able to control and increase the amount of the condensate injected into the superheater 35, a flow-control valve 17 is provided in this bypass line 39. In accordance with the invention, a fourth heat exchanger 41 is arranged in the bypass line 39, which is connected to a collector field 13 and is supplied with solar heat from this collector field 13.

By increasing the temperature of the feed water or injected water condensate in the fourth heat exchanger 41, a larger amount of condensate can be injected into the superheater 35 in order to achieve the desired steam parameters (pressure and temperature) of the live steam. This reduces the amount of fuel power of the steam generator 1 required for obtaining a certain capacity of the steam turbine 3, which directly shows in reduced fuel consumption and/or increased capacity.

Figure 9:
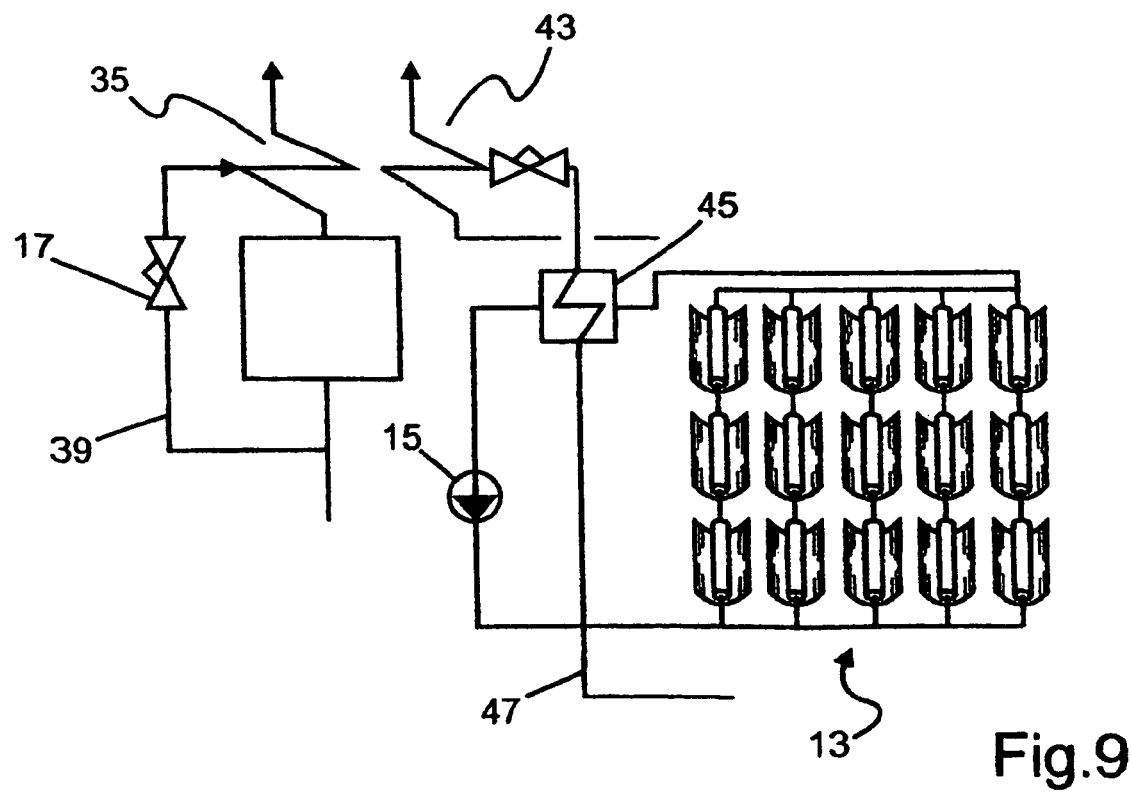

In addition to injection into the superheater 35, FIG. 9 shows injection of feed water into an intermediate superheater 43. A fifth heat exchanger 45 is arranged in the injection water line in series with the intermediate superheater 43. The fifth heat exchanger 45 heats the feed water, which is extracted via a feed water extraction line 47, which is branched off from the feed water line 19 downstream of the feed water pump 9, prior to flowing into the intermediate superheater 43. In accordance with the invention, it is then again possible to couple heat generated by solar energy into the steam circuit through the fifth heat exchanger 45 and thereby optmize either the capacity and/or fuel requirements of the steam power plant.

Figure 10:
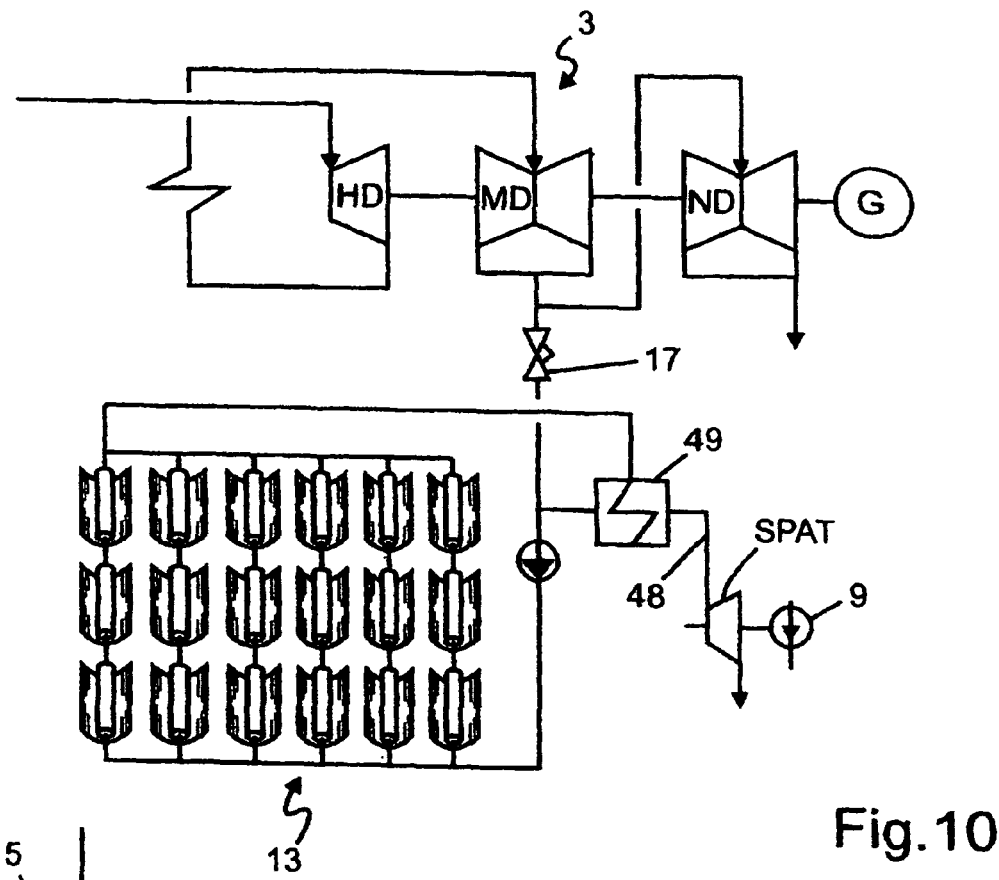

FIG. 10 shows an embodiment, in which the feed water pump 9 is driven by a feed water drive pump turbine SPAT. This feed water drive pump turbine SPAT is operated with extraction steam extracted from the medium-pressure part MD of the steam turbine 3.

Towards this end, the medium-pressure part MD of the steam turbine 3 is provided with an extraction line 49. A sixth heat exchanger 51 is provided in this extraction line 49 downstream of a flow-control valve 17 and is supplied with solar energy from a collector field 13.

It is thereby possible to intermediately superheat the steam extracted from the steam turbine 3 in the sixth heat exchanger 51 and thereby reduce the mass flow of the extracted steam and thereby increase the capacity of the steam turbine 3 and/or reduce the fuel consumption.

Figure 11:
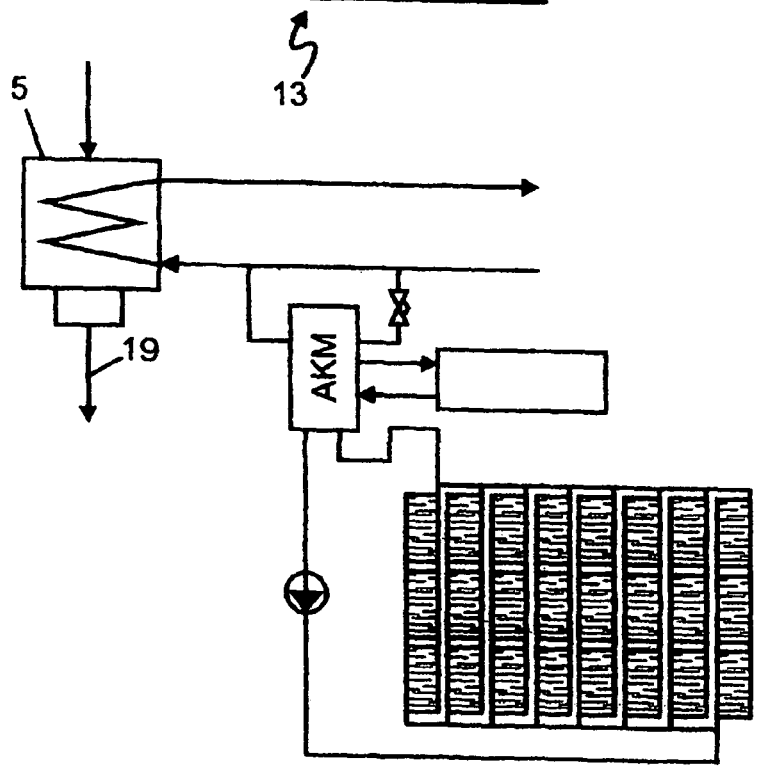

FIG. 11 shows a further inventive variant of coupling solar energy into the steam power process. An absorption refrigerator AKM is thereby operated by means of a solar collector field 13, which refrigerator further cools the cooling water for the condenser 5. The water is thereby only cooled after previous maximum cooling in the cooling tower (not shown) of the steam power plant or by the water of a river (not shown) in the vicinity.

The pressure level in the condenser 5 is reduced through further cooling of the cooling water such that the effective pressure difference increases at the steam turbine 3 and the capacity of the power plant increases in correspondence therewith.

The absorption refrigerator AKM in FIG. 11 is connected to bypass the coolant line that supplies the condenser 5. It is alternatively also possible to integrate the absorption refrigerator directly into the coolant line such that the absorption refrigerator AKM is connected in series with the cooling tower (not shown) and the condenser 5.

Figure 12:
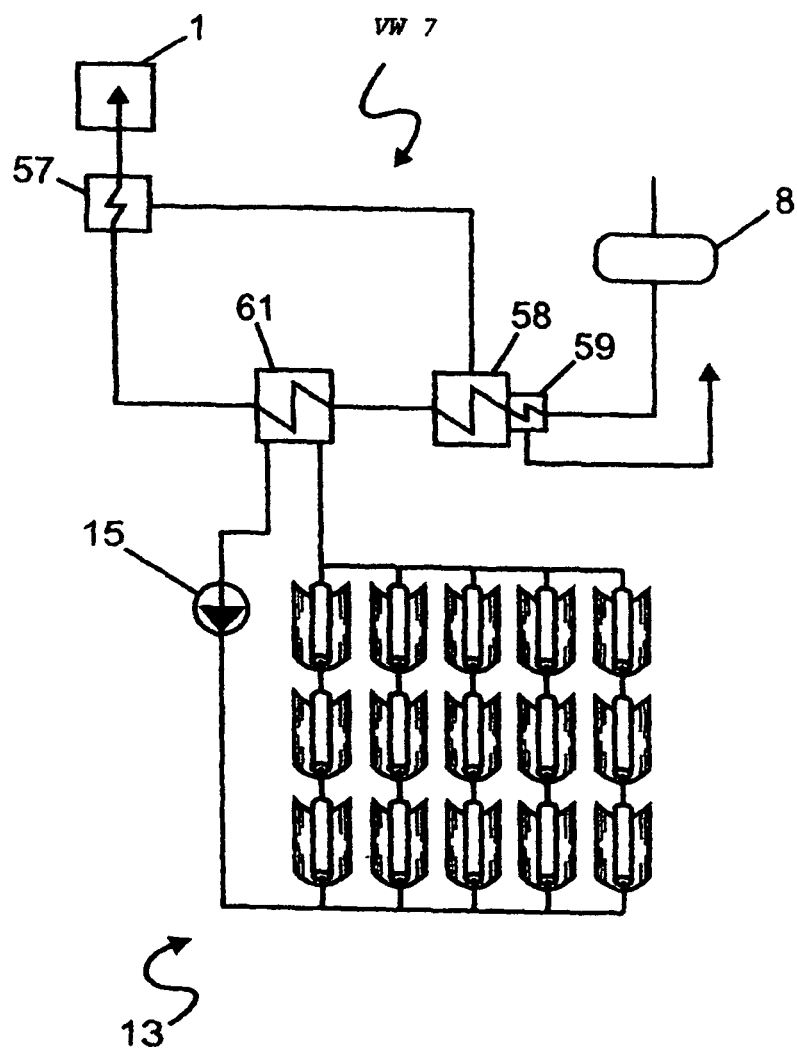

FIG. 12 shows serial integration of a solarly fed seventh heat exchanger 61 into a HD preheater. The inventive serial integration provides an additional solarly fed heat exchanger 61 in the high-pressure preheater path. In order to integrate the solar energy in a thermodynamically most effective fashion, the main components of the last high-pressure preheater $Vw_i$, desuperheater 57, condenser 58 and subcooler 59, are installed spatially separate from each other. The solarly fed heat exchanger 61 is integrated between the desuperheater 57 and the condenser 58 of the last preheater $Vw_i$ that is fed with steam, thereby optimally utilizing the temperature level of the exothermic media. The feed water can thereby be brought to a higher temperature level prior to entering the economizer (Eco) of the steam generator 1. The temperature heating difference of the steam generator 1 becomes smaller and the steam generator 1 must be supplied with less fuel energy while the steam parameters remain the same. With constant heating capacity of the steam generator 1, the live steam mass flow may alternatively be increased, thereby also increasing the generator capacity.

In this embodiment, the last preheater $Vw_i$ was divided into three sub-assemblies, namely a desuperheater 57, a condenser 58 and a subcooler 59. The part of the preheater VW, in which the extracted steam condenses and discharges its condensation heat to the feed water, is called condenser 58. When the accumulated condensate from the condenser 58 has a higher temperature than the incoming feed water, the feed water temperature level may be increased by the subcooler 59. This is more favorable in terms of energy. The desuperheater 57 brings the overheated extracted steam to a saturated steam level. Heat is thereby extracted from the steam and transferred to the feed water. In accordance with the invention, a seventh heat exchanger 61 is provided between the desuperheater 57 and the condenser 58 and transfers the solar heat gained in the collector field to the feed water.

FIG. 13 shows parallel integration of a solarly fed seventh heat exchanger 61 into an HD preheater. This is quasi a variant of the embodiment of FIG. 12. For this reason, only the differences are explained, otherwise the explanations given above in connection with FIG. 12 correspondingly apply.

The seventh heat exchanger 61 is connected in parallel with the feed water line 19 by means of a second bypass line 63. An additional condenser pump 65 is disposed in the second bypass line 63, which conveys a variable partial flow of the condensate that flows in the feed water line 19 through the seventh heat exchanger 61. The additional condensate pump 65 may be speed-controlled.

In order to be able to control the heating difference of the seventh heat exchanger 61 in such a fashion that the solar field 13 can be operated with optimum energy output, one does not heat the overall feed water amount that flows through the feed water line 19 but only a partial mass flow. This partial mass flow is always adjusted to the instantaneously available solar energy through suitable control of the controllable condensate pump 65. In this fashion, the solar field 13 can always be operated at a constant temperature level.

Downstream of the seventh heat exchanger 61, the solarly heated partial mass flow that flows through the second bypass line 63, and the rest of the feed water that flows through the feed water line 19 are combined to obtain a mixing temperature from both mass flows. Due to the optimized heating difference of the seventh heat exchanger 61, the required mass flow through the solar field 13 is reduced. In consequence thereof, the pressure losses on the side of the feed water and solar circuit and the heating losses in the collector field are reduced.

Some of the details of the embodiment described in FIG. 13 may be varied. The interconnection illustrated in FIG. 13 provides that the desuperheater 57 of the last preheater Vwi is integrated such that it is locally separated from the last condenser 58 upstream of the additional heat exchanger for thermodynamic reasons. If this is not possible due to technical reasons or lack of space at the corresponding location in the power plant, the desuperheater may also remain unchanged directly at the condenser part 58 of the preheater VW1.

In case there is no desuperheater 57 for the last high-pressure preheater and subsequent installation is not intended, the solar energy is directly coupled-in downstream of the condensation part 58 of the last preheater VWi. The pump 65 may also possibly be omitted in the second bypass line 63 feed water partial flow.

We claim:
1. A steam power plant comprising:
a steam generator;
a turbine communicating with said steam generator;
a condenser communicating with said turbine;
a condensate line communicating with said condenser, said condensate line having a first partial condensate flow;
a first plurality of preheaters communicating in series with said condensate line;
solar collectors; and
a heat exchanger communicating with said solar collectors and said first partial condensate flow, said heat exchanger being connected in parallel with a second plurality of preheaters, the condensate line connected at the outputs of at least two of the first plurality of preheaters, wherein heat is transferred selectively from said solar collectors in said heat exchanger to said first partial condensate flow as said first partial condensate flow flows through said heat exchanger.

2. The steam power plant of claim 1, wherein the solar collectors comprise at least one of: concentrating collectors, parabolic trough collectors, Fresnel collectors, tower receivers with heliostatic field, non-concentrating collectors, flat collectors, or vacuum tube collectors.

3. The steam power plant of claim 1, wherein water or thermal oil is used as a heat carrier for said solar collectors and for a warm side of said heat exchanger.

4. A steam power plant comprising:
a steam generator;
a turbine communicating with said steam generator;
a condenser communicating with said turbine;
a feed water pump;
a feed water pump power turbine operated by steam for powering the feed water pump;

a steam pipeline disposed between said turbine or between a medium-pressure part of said turbine and said feed water pump power turbine;

solar collectors;

a heat exchanger communicating with said steam pipeline and with said solar collectors to transfer heat from said solar collectors to steam flowing in said steam pipeline; and a flow control valve disposed between said turbine or between the medium-pressure part of said turbine and the heat exchanger to control a flow of the steam.

5. The steam power plant of claim 4, wherein the solar collectors comprise at least one of: concentrating collectors, parabolic trough collectors, Fresnel collectors, tower receivers with heliostatic field, non-concentrating collectors, flat collectors, or vacuum tube collectors.

6. The steam power plant of claim 4, wherein water or thermal oil is used as a heat carrier for said solar collectors and for a warm side of said first heat exchanger.

7. A method for operating a steam power plant, the steam power plant having a steam generator, a turbine, a condenser, a first plurality of preheaters, a second plurality of preheaters, a heat exchanger, and solar collectors, the method comprising:

a) connecting the heat exchanger in parallel with the first plurality of preheaters, a heat exchanger inlet connected at the outputs of at least two of the second plurality of preheaters;

b) transferring heat from the solar collectors in the heat exchanger to a partial condensate or feed water flow flowing through the heat exchanger, wherein said partial condensate or feed water flow in said heat exchanger is controlled in dependence on the temperature of the partial condensate heated by the solar collectors and the temperature of the partial condensate at the output of the at least two of the plurality of preheaters; and c) selectively providing the partial condensate or feed water flow heated by the solar collectors to a selected point between or after the first plurality of preheaters.

8. The method of claim 7, wherein the heat exchanger is connected in parallel with the first plurality of preheaters and the second plurality of preheaters that are connected in series, in dependence on a thermal output that can be transferred from the heat exchanger to the partial condensate or feed water flow.

* * * * *